US012628825B2

(12) United States Patent
Bachiega et al.

(10) Patent No.: US 12,628,825 B2
(45) Date of Patent: May 19, 2026

(54) **METHODS OF CONTROLLING OR PREVENTING INFESTATION OF PLANTS BY PLANT-PARASITIC NEMATODES OF THE GENUS *APHELENCHOIDES* SPP., ESPECIALLY *APHELENCHOIDES BESSEYI***

(71) Applicant: SYNGENTA CROP PROTECTION AG, Basel (CH)

(72) Inventors: Andre Bachiega, São Paulo (BR); Daniela Ribeiro, São Paulo (BR)

(73) Assignee: SYNGENTA CROP PROTECTION AG, Basel (CH)

( * ) Notice: Subject to any disclaimer, the term of this patent is extended or adjusted under 35 U.S.C. 154(b) by 575 days.

(21) Appl. No.: 18/042,057

(22) PCT Filed: Aug. 16, 2021

(86) PCT No.: PCT/EP2021/072666
§ 371 (c)(1),
(2) Date: Feb. 17, 2023

(87) PCT Pub. No.: WO2022/038068
PCT Pub. Date: Feb. 24, 2022

(65) Prior Publication Data

US 2023/0309559 A1    Oct. 5, 2023

(30) Foreign Application Priority Data

Aug. 19, 2020 (EP) .................................... 20191809

(51) Int. Cl.
*A01N 43/40* (2006.01)
*A01P 5/00* (2006.01)

(52) U.S. Cl.
CPC ................ *A01N 43/40* (2013.01); *A01P 5/00* (2021.08)

(58) Field of Classification Search
CPC ..................................................... A01N 43/40
See application file for complete search history.

(56) References Cited

U.S. PATENT DOCUMENTS

| | | | |
|---|---|---|---|
| 9,867,371 B2 | 1/2018 | O-Sullivan et al. | |
| 2010/0048700 A1 | 2/2010 | Davies et al. | |

FOREIGN PATENT DOCUMENTS

| | | | | |
|---|---|---|---|---|
| EP | 2644595 | * | 10/2013 | ........... C07D 213/81 |
| EP | 2644595 | A1 | 10/2013 | |
| JP | 2015-514077 | A | 5/2015 | |
| RU | 2447659 | C2 | 4/2012 | |
| WO | 2013/143811 | A1 | 10/2013 | |
| WO | 2015003951 | A1 | 1/2015 | |
| WO | WO2015/003951 | * | 1/2015 | ........... C07D 213/81 |

OTHER PUBLICATIONS

Rakesh Pashi et al., Jnal of Entomology and Zoology Studies (2017) pp. 269+272.*
Aneta Chalanska et al, Jnal of Plant Disease anand protection (2017) 437-443.*
Aneta Chalanska et al.; "Management of foliar nematode Aphelenchoides ritzemabosi on Anemone hupehensis using plant extracts pesticides"; Journal of Plant Diseases Protection, vol. 124(5), pp. 437-443; May 29, 2017 (XP055768679).
EPO; App. No. EP 20191809.1; Extended European Search Report dated Feb. 5, 2021; pp. 1-8.
Kelsey Mitsuda; "Foliar nematode control using new nematicide formulations ornamental plant safety associated with several new nematicides"; Thesis, pp. 1-43; Aug. 1, 2019 (XP055768838).
Rakesh Pashi et al.; "Management of white tip nematode (*Aphelenchoides besseyi*) in rice in West Bengal"; Journal of Entomology Zoology Studies; pp. 269-272; Jan. 1, 2017 (XP055768671).
WIPO; App. No. PCT/EP2021/072666; International Search Report and Written Opinion mailed Nov. 2, 2021; pp. 1-13.
Y Oka; "The new nematicide nimitz (fluensulfone): its advantages limitations"; Journal of Nematology, p. 214; Jun. 1, 2014 (XP055768802).

* cited by examiner

*Primary Examiner* — Paul V Ward
(74) *Attorney, Agent, or Firm* — BakerHostetler; Toni-Junell Herbert

(57) ABSTRACT

The present invention relates to methods for controlling or preventing infestation of a plant by plant-parasitic nematodes of the genus *Aphelenchoides* spp., comprising applying to a crop of plants, the locus thereof, or propagation material thereof, the compound cyclobutrifluram or a pesticidal composition comprising cyclobutrifluram.

19 Claims, No Drawings

METHODS OF CONTROLLING OR PREVENTING INFESTATION OF PLANTS BY PLANT-PARASITIC NEMATODES OF THE GENUS *APHELENCHOIDES* SPP., ESPECIALLY *APHELENCHOIDES BESSEYI*

CROSS-REFERENCE TO RELATED APPLICATIONS

This application is a U.S. National Stage Application, filed under 35 U.S.C. § 371, of International Application No. PCT/EP2021/072666, filed Aug. 16, 2021, which claims priority to EP 20191809.1, filed Aug. 19, 2020, the entire contents of which are incorporated by reference herein.

TECHNICAL FIELD

The present invention relates to methods for controlling or preventing infestation of a plant by plant-parasitic nematodes of the genus *Aphelenchoides* spp., especially *Aphelenchoides besseyi.*

BACKGROUND

*Aphelenchoides* spp. is a nematode genus which globally infects annual crops like rice, strawberry, beans, cowpea, soybean, cotton and ornamental species (e.g. chrysanthemum, rose, gladiolus, violet, begonia). The nematode attacks young tissues of the aerial parts of plants (stems, leaves, buds, flowers, pods) causing intense reduction of yield of the crops, mainly when the attack is concentrated to the reproductive parts of the plants (flowers, inflorescences, pods). One part of its life cycle it is located on the roots of the plants (like in the majority of plant-parasitic nematodes) and one part of its life cycle it is located on the aerial parts, where the damage to the plants is more pronounced. Hence, there is a strong need for providing effective methods for controlling or preventing infestation of nematodes of the genus *Aphelenchoides* spp., especially *Aphelenchoides besseyi.*

The current invention provides improved methods for controlling or preventing infestation of plants by plant-parasitic nematodes of the genus *Aphelenchoides* spp., especially *Aphelenchoides besseyi.*

DESCRIPTION OF THE EMBODIMENTS

Cyclobutylcarboxamide compounds and processes for their preparation have been disclosed in WO2013/143811 and WO2015/003951. One cyclobutylcarboxamide, cyclobutrifluram (ISO name, CAS RN [1460292-16-3]), has been recently published as being under development as a nematicide (http://pmonline.azurewebsites.net/_Main/Pesticide.aspx). The chemical structure of cyclobutrifluram is (I)

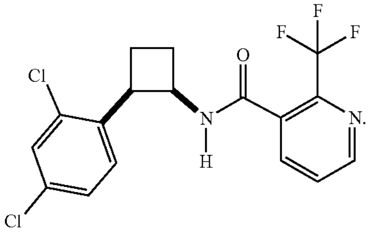

It was known that cyclobutrifluram has activity against root-knot nematodes such as *Meloidogyne* genus and cyst-forming nematodes such as *Heterodera* genus. These nematode species are soil based and attack the root system of many plants. However, nematodes of the *Aphelenchoides* genus attack the aerial parts of a plant such as stems, leaves, buds, flowers, pods. This means that nematodes of the *Aphelenchoides* genus are able to feed both ectoparasitically (on the surface of the plant) and endoparasitically (within the plant tissue). These nematodes can hence move around on the outside and inside of the plant. This makes the task of controlling or preventing infestation by nematodes of the *Aphelenchoides* genus very challenging. The potential nematicide needs not only be active against the target nematode species but must also be able to reach all of the parts of the plants in order to effectively control or prevent the infestation. Most current nematicide offers are not systemic, i.e. they cannot reach all the parts of the plant where nematodes of the *Aphelenchoides* genus are feeding. This leads to less than optimal control of this type of nematodes.

It has now been surprisingly found that cyclobutrifluram is highly effective at controlling or preventing the infestation of plants by plant-parasitic nematodes of the genus *Aphelenchoides* spp. This highly effective compound thus represents an important new solution for farmers to control or prevent infestation of plants by plant-parasitic nematodes of the genus *Aphelenchoides* spp. It has been found that cyclobutrifluram is highly effective when used as a seed treatment against the attack of *Aphelenchoides besseyi. Aphelenchoides besseyi* attacks the aerial parts of the plant which means that cyclobutrifluram is capable to not only protect the seed on which it is applied but also the plant growing from that treated seed. Testing has shown cyclobutrifluram protects the plants growing from a treated seed far more effectively than any currently used commercial standards. Thus, cyclobutrifluram presents an excellent tool for farmers to control or prevent infestation by nematodes of the *Aphelenchoides* genus, especially *Aphelenchoides besseyi.*

Hence, as embodiment 1, there is provided a method of controlling or preventing infestation of a plant by a plant-parasitic nematode of the genus *Aphelenchoides* spp., comprising applying to a crop of plants, the locus thereof, or propagation material thereof, the compound cyclobutrifluram.

Cyclobutrifluram as disclosed above represents the cis racemate: the phenyl ring on the left hand side and the pyridyl-C(=O)—NH group on the right hand side are cis to each other on the cyclobutyl ring as illustrated for compound of formula (Ia) and (Ib):

(Ia)

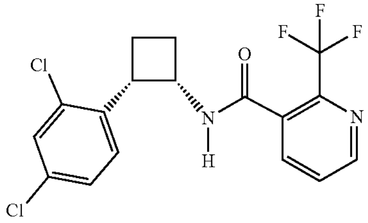

or

-continued (Ib)

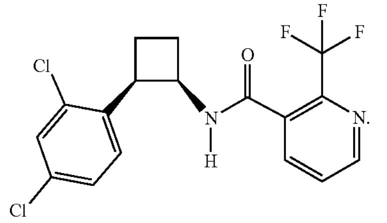

Thus, the racemic compound of cyclobutrifluram is a 1:1 mixture of the compounds of formula (Ia) and (Ib). The wedged bonds shown in the compounds of formula (Ia) and (Ib) represent absolute stereochemistry, whereas the thick straight bonds such as those shown for cyclobutrifluram represent relative stereochemistry in racemic compounds.

It has also surprisingly been found that one enantiomer of cyclobutrifluram is particularly useful in controlling or preventing the infestation of plants by plant-parasitic nematode of the genus *Aphelenchoides* spp.

Thus, as embodiment 2, there is provided the method according to any one of embodiment 1 wherein cyclobutrifluram is in the form of the (1S, 2S) stereoisomer

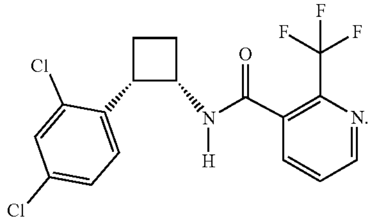 [SMILES: O=C(N[C@H]1CC[C@H]1c1ccc(Cl)cc1Cl)c1cccnc1C(F)(F)F]

A skilled person is aware that according to the method of embodiment 1 or 2, cyclobutrifluram is generally applied as part of a pesticidal composition. Hence, as embodiment 3, there is provided a method of controlling or preventing infestation of plants by plant-parasitic nematodes of the genus *Aphelenchoides* spp. comprising applying to a crop of plants, the locus thereof, or propagation material thereof a pesticidal composition comprising cyclobutrifluram and one or more formulation adjuvants. As embodiment 4, there is provided a method of controlling or preventing infestation of plants by plant-parasitic nematodes of the genus *Aphelenchoides* spp. comprising applying to a crop of plants, the locus thereof, or propagation material thereof a pesticidal composition comprising a compound of formula (Ia) and one or more formulation adjuvants. In a method according to embodiment 5, for pesticidal compositions comprising both the (1S,2S) and (1R,2R) stereoisomers of cyclobutrifluram, the ratio of the (1S,2S) stereoisomer to its enantiomer (1R,2R) is greater than 1:1. Preferably, the ratio of the (1S,2S) to (1S,2S) is greater than 1.5:1, more preferably greater than 2.5:1, especially greater than 4:1, advantageously greater than 9:1, desirably greater than 20:1, in particular greater than 35:1.

Mixtures containing up to 50%, preferably up to 40%, more preferably up to 30%, especially up to 20%, advantageously up to 10%, desirably up to 5%, in particular up to 3%, of the trans stereoisomers of the compounds of formula (I) (i.e. wherein the phenyl and the pyridyl-C(=O)—NH groups are trans to each other) are also understood to be part of this invention. Preferably, the ratio of the cis isomer to its trans isomer is greater than 1.5:1, more preferably greater than 2.5:1, especially greater than 4:1, advantageously greater than 9:1, desirably greater than 20:1, in particular greater than 35:1.

As embodiment 6, there is provided the method according to any one of embodiments 1 to 5, wherein the pesticidal composition is a suspension concentrate composition.

As embodiment 7, there is provided the method according to any one of embodiments 1 to 6 comprising the steps providing cyclobutrifluram or a pesticidal composition comprising cyclobutrifluram as defined in any one of embodiments 1 to 6;

applying the composition to a propagation material;

planting the propagation material.

As embodiment 8, there is provided the method according to any one of embodiments 1 to 6 comprising the steps providing cyclobutrifluram or a pesticidal composition comprising cyclobutrifluram as defined in any one of embodiments 1 to 6;

applying the composition to a crop of plants or the locus thereof.

As embodiment 9, there is provided the use of cyclobutrifluram or a pesticidal composition comprising cyclobutrifluram as defined in any one of embodiments 1 to 6 for controlling or preventing infestation of plants by plant-parasitic nematodes of the genus *Aphelenchoides* spp.

As embodiment 10, there is provided the method or use according to any one of embodiments 1 to 9, wherein the plant-parasitic nematode is *Aphelenchoides besseyi.*

As embodiment 11, there is provided the method or use according to any one of embodiments 1 to 10, where the plant is selected from rice, strawberry, beans, cowpea, soybean, cotton and ornamental species (e.g. chrysanthemum, rose, gladiolus, violet, begonia).

As embodiment 12, there is provided the method or use according to any one of embodiments 1 to 10, where the plant is selected from rice, soybean and cotton.

As embodiment 13, there is provided the method or use according to any one of embodiments 1 to 10, where the plant is selected from soybean and cotton.

As embodiment 14, there is provided the method or use according to any one of embodiments 1 to 10, where the plant is selected from soybean.

As embodiment 15, there is provided a method for growing soybean comprising applying or treating a propagation material thereof with cyclobutrifluram or a pesticidal composition comprising cyclobutrifluram as defined in any one of embodiments 1 to 6.

As embodiment 16, there is provided a method for growing cotton comprising applying or treating a propagation material thereof with cyclobutrifluram or a pesticidal composition comprising cyclobutrifluram as defined in any one of embodiments 1 to 6.

As embodiment 17, there is provided a method for growing beans comprising applying or treating a propagation material thereof with cyclobutrifluram or a pesticidal composition comprising cyclobutrifluram as defined in any one of embodiments 1 to 6.

As embodiment 18, there is provided a method for growing strawberry plants comprising applying or treating a propagation material thereof with cyclobutrifluram or a pesticidal composition comprising cyclobutrifluram as defined in any one of embodiments 1 to 6.

As embodiment 19, there is provided a method for growing ornamental species comprising applying or treating a propagation material thereof with cyclobutrifluram or a pesticidal composition comprising cyclobutrifluram as defined in any one of embodiments 1 to 6.

As embodiment 20, there is provided a method for growing rice comprising applying or treating a propagation material thereof with cyclobutrifluram or a pesticidal composition comprising cyclobutrifluram as defined in any one of embodiments 1 to 6.

As embodiment 21, there is provided a method or use according to any one of embodiments 1 to 20 wherein the propagation material is a seed.

As embodiment 22, there is provided a method or use according to any one of embodiments 1 to 21, wherein the compound cyclobutrifluram is applied onto the seed in an amount of between 5 gram and 100 gram cyclobutrifluram per 100 kg seeds.

As embodiment 23, there is provided a method or use according to any one of embodiments 1 to 21, wherein the compound cyclobutrifluram is applied onto the seed in an amount of between 10 gram and 80 gram cyclobutrifluram per 100 kg seeds.

As embodiment 24, there is provided a method or use according to any one of embodiments 1 to 21, wherein the compound cyclobutrifluram is applied onto the seed in an amount of between 10 gram and 40 gram cyclobutrifluram per 100 kg seeds.

The preparation of cyclobutrifluram has been disclosed in WO2013/143811 and WO2015/003951 which are incorporated herein by reference.

The term "seed" embraces seeds and plant propagules of all kinds including but not limited to true seeds, seed pieces, suckers, corns, bulbs, fruit, tubers, grains, rhizomes, cuttings, cut shoots and the like and means in a preferred embodiment true seeds.

Application according to the methods or uses according to any one of embodiments 1 to 24 is preferably to a crop of plants, the locus thereof or propagation material thereof. Preferably application is to a crop of plants or propagation material thereof, more preferably to propagation material. Application of cyclobutrifluram or a pesticidal composition comprising cyclobutrifluram can be performed according to any of the usual modes of application, e.g. foliar, drench, soil, in furrow etc.

The compounds as defined in any one of embodiments 1 to 24 are preferably used for pest control at 1 to 500 g/ha, preferably 10-70 g/ha.

The methods as defined in any one of embodiments 1 to 24 are suitable for use on any plant, including those that have been genetically modified to be resistant to active ingredients such as herbicides, or to produce biologically active compounds that control infestation by plant pests.

Generally, cyclobutrifluram is used in the form of a composition (e.g. formulation) containing a carrier. Cyclobutrifluram and compositions comprising cyclobutrifluram as defined in any one of embodiments 1 to 5 can be used in various forms such as aerosol dispenser, capsule suspension, cold fogging concentrate, dustable powder, emulsifiable concentrate, emulsion oil in water, emulsion water in oil, encapsulated granule, fine granule, flowable concentrate for seed treatment, gas (under pressure), gas generating product, granule, hot fogging concentrate, macrogranule, microgranule, oil dispersible powder, oil miscible flowable concentrate, oil miscible liquid, paste, plant rodlet, powder for dry seed treatment, seed coated with a pesticide, soluble concentrate, soluble powder, solution for seed treatment, suspension concentrate (flowable concentrate), ultra low volume (ulv) liquid, ultra low volume (ulv) suspension, water dispersible granules or tablets, water dispersible powder for slurry treatment, water soluble granules or tablets, water soluble powder for seed treatment and wettable powder.

A formulation typically comprises a liquid or solid carrier and optionally one or more customary formulation auxiliaries, which may be solid or liquid auxiliaries, for example unepoxidized or epoxidized vegetable oils (for example epoxidized coconut oil, rapeseed oil or soya oil), antifoams, for example silicone oil, preservatives, clays, inorganic compounds, viscosity regulators, surfactant, binders and/or tackifiers. The composition may also further comprise a fertilizer, a micronutrient donor or other preparations which influence the growth of plants as well as comprising a combination containing the compound of the invention with one or more other biologically active agents, such as bactericides, fungicides, nematicides, plant activators, acaricides, and insecticides.

The compositions are prepared in a manner known per se, in the absence of auxiliaries for example by grinding, screening and/or compressing a solid compound of the present invention and in the presence of at least one auxiliary for example by intimately mixing and/or grinding the compound of the present invention with the auxiliary (auxiliaries). In the case of solid compounds of the invention, the grinding/milling of the compounds is to ensure specific particle size.

Examples of compositions for use in agriculture are emulsifiable concentrates, suspension concentrates, microemulsions, oil dispersibles, directly sprayable or dilutable solutions, spreadable pastes, dilute emulsions, soluble powders, dispersible powders, wettable powders, dusts, granules or encapsulations in polymeric substances, which comprise—at least—cyclobutrifluram and the type of composition is to be selected to suit the intended aims and the prevailing circumstances.

As a rule, the compositions comprise 0.1 to 99%, especially 0.1 to 95%, of cyclobutrifluram and 1 to 99.9%, especially 5 to 99.9%, of at least one solid or liquid carrier, it being possible as a rule for 0 to 25%, especially 0.1 to 20%, of the composition to be surfactants (% in each case meaning percent by weight). Whereas concentrated compositions tend to be preferred for commercial goods, the end consumer as a rule uses dilute compositions which have substantially lower concentrations of active ingredient.

Examples of foliar formulation types for pre-mix compositions are:

GR: Granules
WP: wettable powders
WG: water dispersable granules (powders)
SG: water soluble granules
SL: soluble concentrates
EC: emulsifiable concentrate
EW: emulsions, oil in water
ME: micro-emulsion
SC: aqueous suspension concentrate
CS: aqueous capsule suspension
OD: oil-based suspension concentrate, and
SE: aqueous suspo-emulsion.

Whereas, examples of seed treatment formulation types for pre-mix compositions are:

WS: wettable powders for seed treatment slurry
LS: solution for seed treatment
ES: emulsions for seed treatment
FS: suspension concentrate for seed treatment
WG: water dispersible granules, and
CS: aqueous capsule suspension.

Examples of formulation types suitable for tank-mix compositions are solutions, dilute emulsions, suspensions, or a mixture thereof, and dusts.

As with the nature of the formulations, the methods of application, such as foliar, drench, spraying, atomizing, dusting, scattering, coating or pouring, are chosen in accordance with the intended objectives and the prevailing circumstances.

The tank-mix compositions are generally prepared by diluting with a solvent (for example, water) the one or more pre-mix compositions containing different pesticides, and optionally further auxiliaries.

Suitable carriers and adjuvants can be solid or liquid and are the substances ordinarily employed in formulation technology, e.g. natural or regenerated mineral substances, solvents, dispersants, wetting agents, tackifiers, thickeners, binders or fertilizers.

Generally, a tank-mix formulation for foliar or soil application comprises 0.1 to 20%, especially 0.1 to 15%, of the desired ingredients, and 99.9 to 80%, especially 99.9 to 85%, of a solid or liquid auxiliaries (including, for example, a solvent such as water), where the auxiliaries can be a surfactant in an amount of 0 to 20%, especially 0.1 to 15%, based on the tank-mix formulation.

Typically, a pre-mix formulation for foliar application comprises 0.1 to 99.9%, especially 1 to 95%, of the desired ingredients, and 99.9 to 0.1%, especially 99 to 5%, of a solid or liquid adjuvant (including, for example, a solvent such as water), where the auxiliaries can be a surfactant in an amount of 0 to 50%, especially 0.5 to 40%, based on the pre-mix formulation.

Normally, a tank-mix formulation for seed treatment application comprises 0.25 to 80%, especially 1 to 75%, of the desired ingredients, and 99.75 to 20%, especially 99 to 25%, of a solid or liquid auxiliaries (including, for example, a solvent such as water), where the auxiliaries can be a surfactant in an amount of 0 to 40%, especially 0.5 to 30%, based on the tank-mix formulation.

Typically, a pre-mix formulation for seed treatment application comprises 0.5 to 99.9%, especially 1 to 95%, of the desired ingredients, and 99.5 to 0.1%, especially 99 to 5%, of a solid or liquid adjuvant (including, for example, a solvent such as water), where the auxiliaries can be a surfactant in an amount of 0 to 50%, especially 0.5 to 40%, based on the pre-mix formulation.

Whereas commercial products will preferably be formulated as concentrates (e.g., pre-mix composition (formulation)), the end user will normally employ dilute formulations (e.g., tank mix composition).

Preferred seed treatment pre-mix formulations are aqueous suspension concentrates. The formulation can be applied to the seeds using conventional treating techniques and machines, such as fluidized bed techniques, the roller mill method, rotostatic seed treaters, and drum coaters. Other methods, such as spouted beds may also be useful. The seeds may be presized before coating. After coating, the seeds are typically dried and then transferred to a sizing machine for sizing. Such procedures are known in the art. Cyclobutrifluram is particularly suited for use in soil and seed treatment applications.

The invention will now be illustrated by the following non-limiting Examples. All citations are incorporated by reference.

Biological Examples

Effect of Nematicide Treatments Against *Aphelenchoides* Spp.

A soybean pot trial was carried out in the greenhouse of Holambra Field Station, state of Sao Paulo, Brazil, to evaluate the efficacy of nematicidal treatments against *Aphelenchoides besseyi.*

The seeds of the susceptible soybean variety Nidera 6828 IPRO were treated (seed treatment) at the field station with the use of a slurry (spray solution) of 0.6 liter per 100 kg of seeds of soybean. The treated seeds (treatments 3-10) were then compared with the untreated checks.

Two seeds were sowed in 1-liter pots with the Holambra Mix (25% of Holambra station soil and 75% pasteurized sand). After the emergence of soybean, there was a selection of plants by the elimination of the less developed plant of pot; each pot had a final stand of 1 plant per pot for further inoculation. The inoculation of each plant with the nematode was performed at 8 days after emergence (at the crop stage V1) by using a pipet with 1000 juveniles of *Aphelenchoides* per plant, directed to the base of the plant. Each plot of the trial was 1 pot containing 1 infested plant of soybean. A total of 6 replicates per treatment was used. The plants were grown in separated plastic chambers (to avoid contamination of plots) inside a greenhouse that averaged 30° C. in the day and 20° C. in the night. Plants were watered many times per day (for keeping a favourable environment for the growth of nematode population and migration to the aerial part of plants) by an automatic sprinkler system. The nematode counting [the total number of juveniles per gram of aerial part (stems+leaves) was performed 28 days after inoculation (28 DAI)].

Trial Location:

| Trial Location | Sown | Variety | Resistance Status |
|---|---|---|---|
| Holambra Field Station, Sao Paulo State, Brazil | Trial 52734 - Date: 9 Jan. 2020 | Nidera 6828 IPRO | Susceptible |

Treatment List—Greenhouse Trial:

| | Treatment | Active ingredient (AI) Rate (g AI/100 kg of seeds) | Application method |
|---|---|---|---|
| 1 | UNTREATED CHECK - Without Nematode Inoculation (NI) | — | — |
| 2 | UNTREATED CHECK - With a Nematode Inoculation (NI) | — | — |
| 3 | Commercial standard: Avicta 500FS (abamectin) | 50 g AI/100 kg of seeds | Seed treatment |
| 4 | Commercial standard: Succinate dehydrogenase inhibitor - Ilevo 600FS (fluopyram) | 60 g AI/100 kg of seeds | Seed treatment |
| 5 | CYCLOBUTRIFLURAM 500FS | 5 g AI/100 kg of seeds | Seed treatment |
| 6 | CYCLOBUTRIFLURAM 500FS | 10 g AI/100 kg of seeds | Seed treatment |
| 7 | CYCLOBUTRIFLURAM 500FS | 20 g AI/100 kg of seeds | Seed treatment |
| 8 | CYCLOBUTRIFLURAM 500FS | 40 g AI/100 kg of seeds | Seed treatment |

-continued

| | Treatment | Active ingredient (Al) Rate (g Al/100 kg of seeds) | Application method |
|---|---|---|---|
| 9 | CYCLOBUTRIFLURAM 500FS | 60 g Al/100 kg of seeds | Seed treatment |
| 10 | CYCLOBUTRIFLURAM 500FS | 80 g Al/100 kg of seeds | Seed treatment |

Note:
treatments 2, 3, 4, 5, 6, 7, 8, 9 and 10: all received a nematode inoculation (NI)

Crops and Targets Occurred in the Trial:

| | Latin name | Common name |
|---|---|---|
| Target | *Aphelenchoides besseyi* | — |
| Crop | Glycine max (L.) Merr. | Soybean |

Crop Description:

| Test Crop | Soybean - Glycine max (L.) Merr. |
|---|---|
| Variety | Nidera 6828 IPRO |
| Sowing Date | 9 Jan. 2020 |

Trial Layout:

| Trial Environment (Test Method) | Greenhouse |
|---|---|
| Experimental Design | RANDOMIZED COMPLETE BLOCK |
| # replications | 6 |

Application Details:

| | |
|---|---|
| Application Date | 9 Jan. 2020 |
| Appl. Equipment Type | Seed treatment (spray solution inside a plastic bag for uniform seed coverage) |
| Spray Volume | 0.6 liter per 100 kg of seeds |
| Treatments applied | 3, 4, 5, 6, 7, 8, 9, 10 |

Assessments:

Nematode control (number of juveniles per gram of fresh plant material), 28 days after inoculation:

| | Number of juveniles per gram of fresh plant material (Treatments with no letter in common are significantly different at the 10% probability level - Scott-Knott test) | % efficacy based on nematode number vs. untreated check (inoculated) |
|---|---|---|
| UNTREATED CHECK - Without Nematode Inoculation (NI) | 0 C | NA |
| UNTREATED CHECK - With a Nematode Inoculation (NI) | 48.1 A | 0.00 |
| Avicta 500FS (ABAMECTIN) 50 G Al per 100 kg of seeds | 23.7 B | 51% |
| Ilevo 600FS (FLUOPYRAM) 60 G Al per 100 kg of seeds | 12.5 C | 74% |

-continued

| | Number of juveniles per gram of fresh plant material (Treatments with no letter in common are significantly different at the 10% probability level - Scott-Knott test) | % efficacy based on nematode number vs. untreated check (inoculated) |
|---|---|---|
| CYCLOBUTRIFLURAM 500FS 5 G Al per 100 kg of seeds | 14.6 C | 70% |
| CYCLOBUTRIFLURAM 500FS 10 G Al per 100 kg of seeds | 2.4 C | 95% |
| CYCLOBUTRIFLURAM 500FS 20 G Al per 100 kg of seeds | 7.6 C | 84% |
| CYCLOBUTRIFLURAM 500FS 40 G Al per 100 kg of seeds | 2.8 C | 94% |
| CYCLOBUTRIFLURAM 500FS 60 G Al per 100 kg of seeds | 5.4 C | 89% |
| CYCLOBUTRIFLURAM 500FS 80 G Al per 100 kg of seeds | 4.5 C | 91% |

CONCLUSION

In this trial, cyclobutrifluram showed surprisingly excellent activity against *Aphelenchoides besseyi* which attacked soybean in a 28-day after inoculation assessment, being statistically superior (even at the lowest rate tested of 5 g Al per 100 kg of seeds) to Avicta 500FS and Ilevo 600FS.

The invention claimed is:

1. A method of controlling or preventing infestation of a plant by a plant-parasitic nematode of the genus *Aphelenchoides* spp., comprising applying to a crop of plants, the locus thereof, or propagation material thereof, the compound cyclobutrifluram.

2. The method according to claim 1, wherein the compound cyclobutrifluram is applied as a pesticidal composition comprising cyclobutrifluram and one or more formulation adjuvants.

3. The method according to claim 2, wherein the pesticidal composition is a suspension composition.

4. The method according to claim 1, wherein the plant-parasitic nematode is *Aphelenchoides besseyi.*

5. The method according to claim 1, wherein the plant is selected from rice, strawberry, beans, cowpea, soybean, cotton and ornamental species.

6. The method according to claim 1, wherein the plant is soybean or cotton.

7. The method according to claim 1, wherein the plant is soybean.

8. The method according to claim 1, wherein the compound cyclobutrifluram or a pesticidal composition comprising cyclobutrifluram is applied on the propagation material.

9. The method according to claim 8, wherein the propagation material is a seed.

10. The method according to claim 9, wherein the compound cyclobutrifluram is applied onto the seed in an amount of between 5 gram and 100 gram cyclobutrifluram per 100 kg seeds.

11. The method according to claim 9, wherein the compound cyclobutrifluram is applied onto the seed in an amount of between 10 gram and 80 gram cyclobutrifluram per 100 kg seeds.

12. The method according to claim 9, wherein the compound cyclobutrifluram is applied onto the seed in an amount of between 10 gram and 40 gram cyclobutrifluram per 100 kg seeds.

13. A method of controlling infestation of a plant by a plant-parasitic nematode of the genus *Aphelenchoides* spp., comprising applying to a crop of plants, the locus thereof, or propagation material thereof, a pesticidal composition comprising the compound cyclobutrifluram and one or more formulation adjuvants.

14. The method of claim 13, wherein the plant-parasitic nematode is *Aphelenchoides besseyi.*

15. The method of claim 13, wherein the plant is soybean.

16. The method of claim 15, wherein the pesticidal composition comprising cyclobutrifluram is applied on the propagation material.

17. The method of claim 16, wherein the propagation material is a seed.

18. The method of claim 17, wherein the compound cyclobutrifluram is applied onto the seed in an amount of between 5 gram and 100 gram cyclobutrifluram per 100 kg seeds.

19. The method of claim 18, wherein the number of juveniles of *Aphelenchoides* spp. per gram of fresh plant material, at 28 days after inoculation, is reduced by at least 70% compared to an untreated check.

* * * * *